United States Patent [19]

Loce et al.

[11] Patent Number: 4,761,062
[45] Date of Patent: Aug. 2, 1988

[54] GRADIENT INDEX LENS ARRAY WITH IMPROVED IMAGE QUALITY DUE TO STRAY LIGHT REDUCTION

[75] Inventors: Robert P. Loce; John A. Durbin; William L. Lama, all of Webster, N.Y.

[73] Assignee: Xerox Corporation, Stamford, Conn.

[21] Appl. No.: 923,455

[22] Filed: Oct. 27, 1986

[51] Int. Cl.⁴ .............................................. G02B 6/04
[52] U.S. Cl. ................................ 350/413; 350/96.25; 355/1
[58] Field of Search ................... 350/413, 96.25, 96.31; 355/1

[56] References Cited

U.S. PATENT DOCUMENTS

| | | | |
|---|---|---|---|
| 2,976,447 | 3/1961 | McNaney | 350/96.25 |
| 3,658,407 | 4/1972 | Kitano et al. | 355/96 B |
| 3,947,106 | 3/1976 | Hamaguchi et al. | 355/1 |
| 3,977,777 | 8/1976 | Tanaka et al. | 355/1 |
| 4,264,130 | 4/1981 | Ogura | 350/96.25 |
| 4,345,833 | 8/1982 | Siegmund | 355/1 |
| 4,424,523 | 1/1984 | Snelling et al. | 346/160 |
| 4,509,826 | 4/1985 | Araghi | 350/286 |

FOREIGN PATENT DOCUMENTS 0068175  1/1983  Japan .............................. 350/96.25

*Primary Examiner*—John K. Corbin
*Assistant Examiner*—Rebecca D. Gass

[57] ABSTRACT

A gradient index lens array having improved stray light characteristics is enabled by coating the surfaces of the fibers comprising the array with a low transmittance, low viscosity material. The index of this material is matched to that of the fiber surface to prevent Fresnel reflection. The interstitial areas of the lens array comprises a light absorbing material. In another embodiment, stray light caused by light scattering at the end faces of the lens array is reduced by masking the end face with a mask having apertures overlying the fiber faces. The mask apertures have slightly smaller diameters to mask out the rough outer edge of the fibers.

5 Claims, 5 Drawing Sheets

GRADIENT INDEX LENS ARRAY WITH IMPROVED IMAGE QUALITY DUE TO STRAY LIGHT REDUCTION

The present invention relates to gradient index lens arrays and, more particularly, to lens arrays having light absorbing and index matched materials between the lenses which reduce stray light levels.

Image transmitters comprising bundled gradient index optical fibers are well known in the art. U.S. Pat. No. 3,658,407 describes a light conducting fiber made of glass or synthetic resin which has a refractive index distribution in a cross-section thereof that varies parabolically outward from a center axis thereof. Each fiber acts as a focusing lens to transmit part of an image of an object placed near one end thereof and an assembly of fibers, transmit and focus a complete image of the object at an image plane. The fiber lenses are produced under the trade name "SELFOC". The mark is registered in Japan and owned by Nippon Sheet Glass Co., Ltd.

These gradient index lens arrays have found use in a number of technologies; e.g. as a replacement for conventional optical systems in copiers as disclosed in U.S. Pat. Nos. 3,947,106 and 3,977,777, as lens scanners imaging a document onto a full width detector array as disclosed, for example, in U.S. Pat. No. 4,509,826 and as the imaging device for an electronic printer as disclosed in U.S. Pat. No. 4,424,523.

A problem in using the gradient index lens arrays is the effect of stray light transmitted through the lens (also known as flare light) which produces a "flare skirt" surrounding image points projected onto a photosensitive image plane. Various techniques have been used in prior art devices to reduce the stray light levels. In U.S. Pat. No. 4,345,833, the gradient index fibers in an array are surrounded by a glass matrix having a refractive index approximating that of the fibers and further having light absorbing properties. In U.S. Pat. No. 4,264,130 there is disclosed a lens array surrounded by an epoxy adhesive where refractive index is higher than that of the gradient index fibers. These prior art techniques serve to reduce stray light levels (flare skirts) to about 2% of the peak image light but even at these relatively low levels, resolution of a projected image is adversely affected.

The present invention is therefore directed to a gradient index lens array having extremely low levels of stray light. More particularly the invention is directed towards a gradient index lens array comprising, in combination:

- at least one row of gradient index optical fibers, the fibers having smooth surfaces;
- a low transmittance coating formed in optical contact with said fiber surfaces, having an index approximately equal to that of the fiber surface; and
- a low reflection material forming a binding between the coated fibers, said material filling the interstitial area between said coated fibers and the outer side of the lens array.

DESCRIPTION

Figure 1:
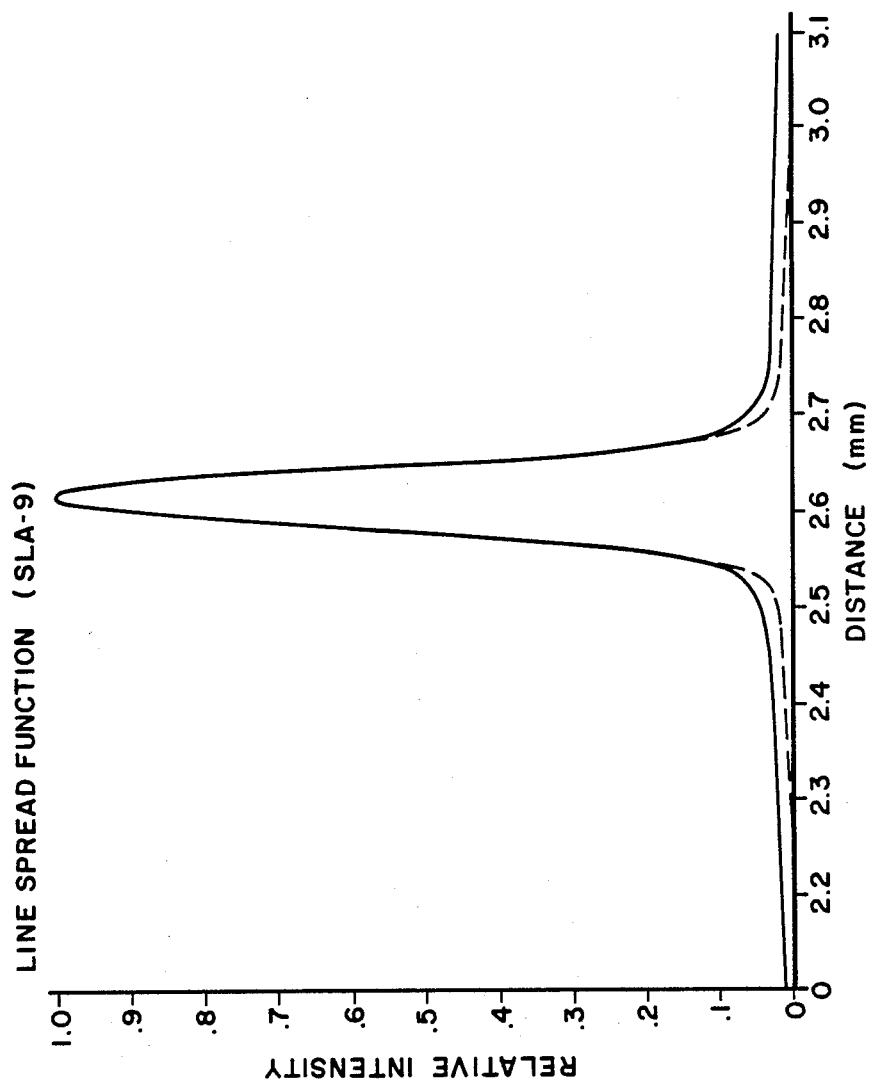
FIG. 1 is a plot of line spread function for a prior art gradient index lens array.
Figure 2:
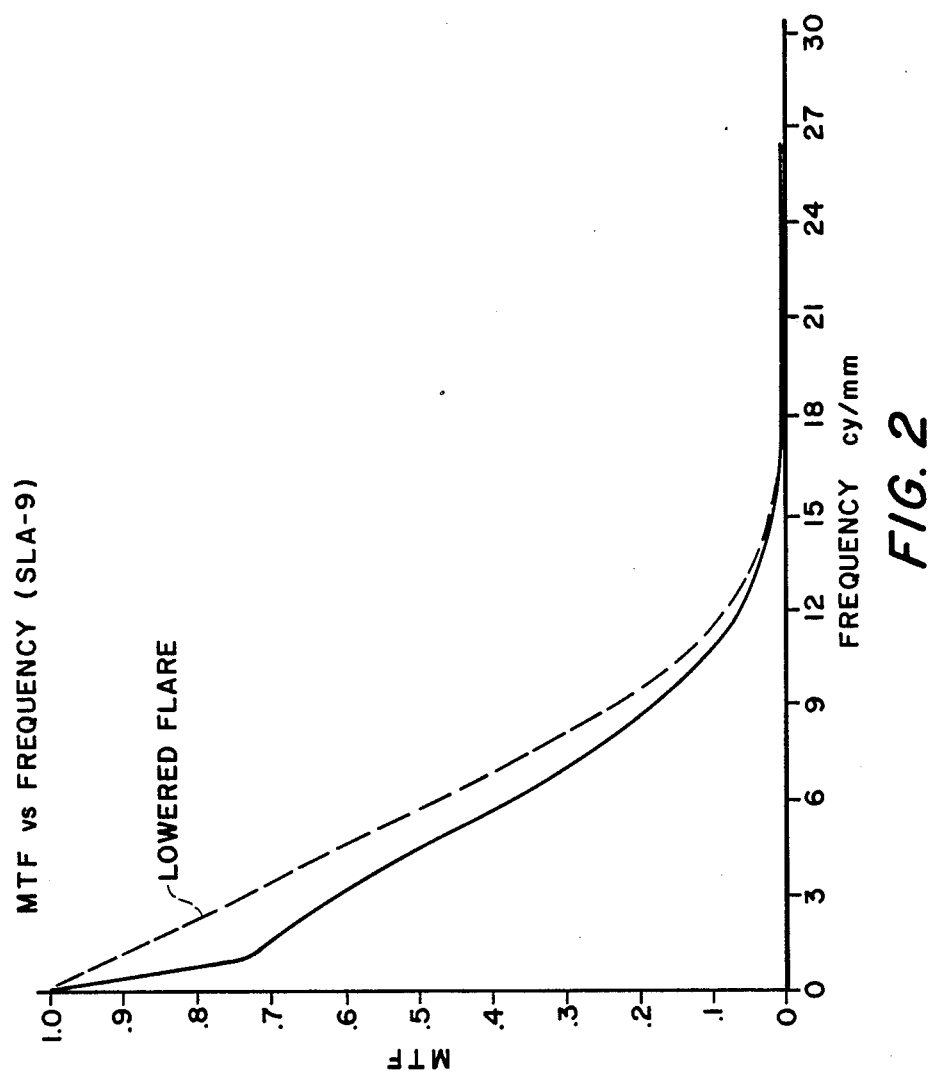
FIG. 2 is a plot of modulation transfer function (MTF) vs. frequency for the prior art device of FIG. 1.

The effect of stray light in an optical system utilizing a gradient index lens array is best appreciated by examining a line spread function obtained from a prior art lens. FIG. 1 shows a line spread function obtained from a commercially available SLA-9 SELFOC ™ lens array made and sold by Nippon Sheet Glass Co. The spread function is quite narrow (full width at half maximum is 0.07 mm) and the level of stray light is relatively low (approximately 2%) as shown by the low level of the flare skirt. The resulting modulation transfer function (MTF) shown by the solid line in FIG. 2 assumes that stray light is the major contributor to the flare skirt. As seen, the MTF drops by about 25% from zero to one cycle per mm. If the flare is reduced by even a small amount, the MTF can be greatly improved at low frequencies. For example, the dashed line in FIG. 1 was obtained by subtracting a low DC level from the spread function, such that the flare skirt is lower and goes to 0. This small change has a significant effect on the MTF (as shown by the dashed curve in FIG. 2). For this example, the MTF, at low frequencies (1 cy/mm) increases from 73% to 91%).

Figure 3:
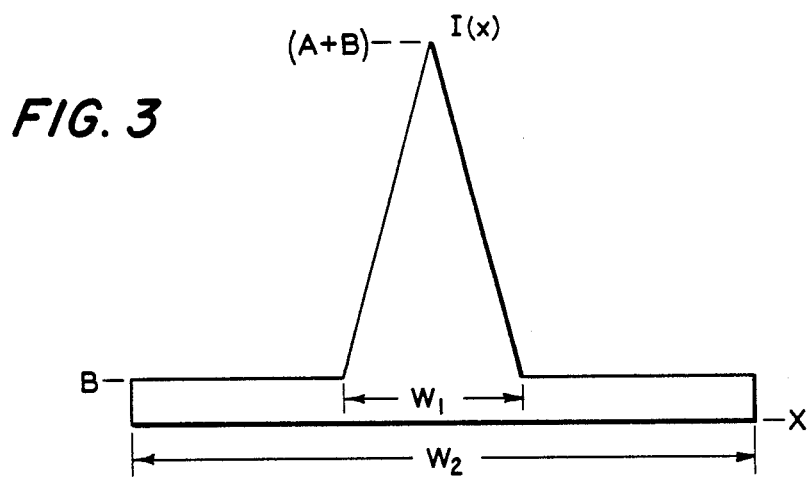
FIG. 3 shows a line spread function with stray light defined by a triangle and rectangle function model.

Further analytical understanding of the stray light effect is achieved with the aid of a simple model. The line spread function, with flare, can be described by the sum of a triangle and a rectangle function, as shown in FIG. 3. The intensity is given by $$I(x) = A\, tri(2x/W_1) + B\, rect(x/W_2) \tag{1}$$

where B/A is the relative flare level which is usually quite low (~1%). The MTF is the magnitude of the Fourier transform of the unit area spread function. Normalizing the spread function yields a useful relationship between the amplitudes and widths:

$$\tfrac{1}{2}AW_1 + BW_2 = 1 \tag{2}$$

The MTF is then given by $$MTF = |\tfrac{1}{2}AW_1 \operatorname{sinc}^2(\tfrac{1}{2}W_1 f) + BW_2 \operatorname{sinc}(W_2 f)| \tag{3}$$

where f is the spatial frequency. Now the spread functions obtained in practice usually have wide ($W_2 >> W_1$), low level ($B << A$) flare, such that the MTF can be approximated by $$MTF \approx \tfrac{1}{2}AW_1 \operatorname{sinc}^2(\tfrac{1}{2}W_1 f) \tag{4}$$

when Equation (2) is substituted into Equation (4), $$MTF \approx (1 - BW_2)\operatorname{sinc}^2(\tfrac{1}{2}W_1 f) \tag{5}$$

Figure 4:
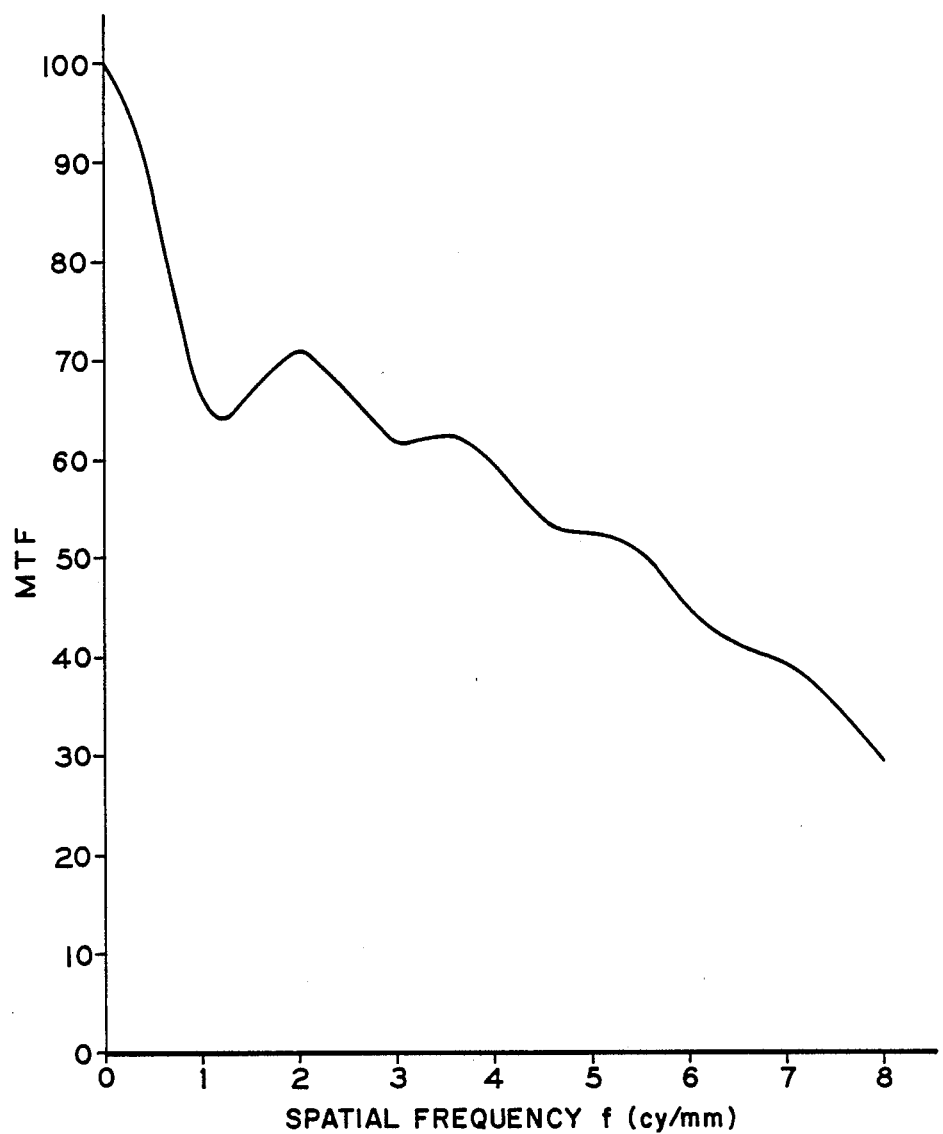
FIG. 4 is a plot of MTF vs. spatial frequency for a specific example of the FIG. 3 function.

The MTF is reduced by the flare by an amount equal to the integral of the flare ($BW_2$). Thus, low level flare will be a problem if it is spread out (large $W_2$). A numerical example is plotted in FIG. 4 for the case

| | |
|---|---|
| A = 11.9 | $W_1$ = .12 mm |
| B = .02A = .24 | $W_2$ = $10W_1$ = 1.2 mm |

The MTF, calculated from Equation (3), shows the abrupt drop at low frequency due to the flare. From this model it is clear that even low levels of stray light can account for the large decrease in resolution observed with prior art arrays such as SELFOC TM commercial arrays.

Figure 5:
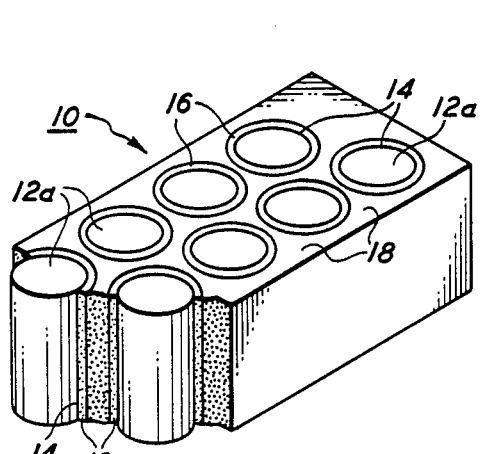
FIG. 5 is a perspective view of a gradient index lens array formed according to the present invention.
Figure 6:
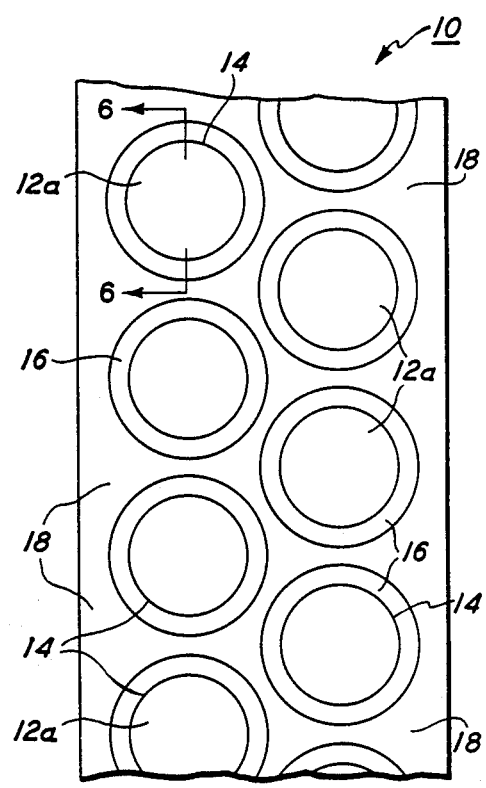
FIG. 6 is a top view of a gradient index lens array formed according to the present invention.
Figure 7:
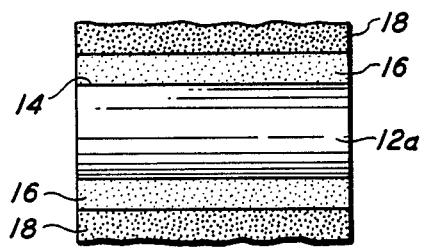
FIG. 7 is a side cross-sectional view of one of the fibers of the array in FIG. 5.

FIGS. 5 and 6 are a perspective and top view of gradient index lens array 10 having a plurality of gradient index fibers 12 combined in a two-row bundled configuration. FIG. 7 is a side cross-sectional view of one fiber 12a. It is appreciated from the two figures that the fibers are narrow and long and that the total area of the fiber surface is large with respect to their aperture areas. Any light incident on the side walls which is not absorbed will result in stray light in the image. The key to reduction of the stray light is to minimize the reflection (scattering) effect from these fiber surfaces. According to a first aspect of the present invention, fiber surfaces 14 of the fibers are formed with a smooth etched or polished finish. A low viscosity lacquer coating 16 of approximately the same index as the surface of the fiber and with light absorbing properties is coated on the fiber surface. The viscosity is low to allow intimate (optical) contact with the micro structure of the fiber surface. When dried, the lacquer index of refraction should match the fiber surface index. The index match prevents any Fresnel reflection from occurring. As one example of an SLA-9 lens array the index of refraction of the dried lacquer should be 1.599. The lacquer should be black and thick enough (approximately 15 microns for the SLA-9 lens) to absorb more than 90% of the light. To complete the light-absorbing mechanism, a low reflective light-absorbing material 18 fills the interstitial area between the coated fibers. In a preferred embodiment, black silicone is used. In the SLA-9 array there are 53 microns between fibers. This space is filled with the lacquer and silicone. This embodiment provides an MTF function equivalent to that shown in the dashed profile of FIG. 2.

While the numbers given above apply specifically to the SLA-9 array, the method applies to any gradient index array. Furthermore, the separation of the fibers may be increased to allow for more light absorbing lacquer and silicone.

Figure 8:
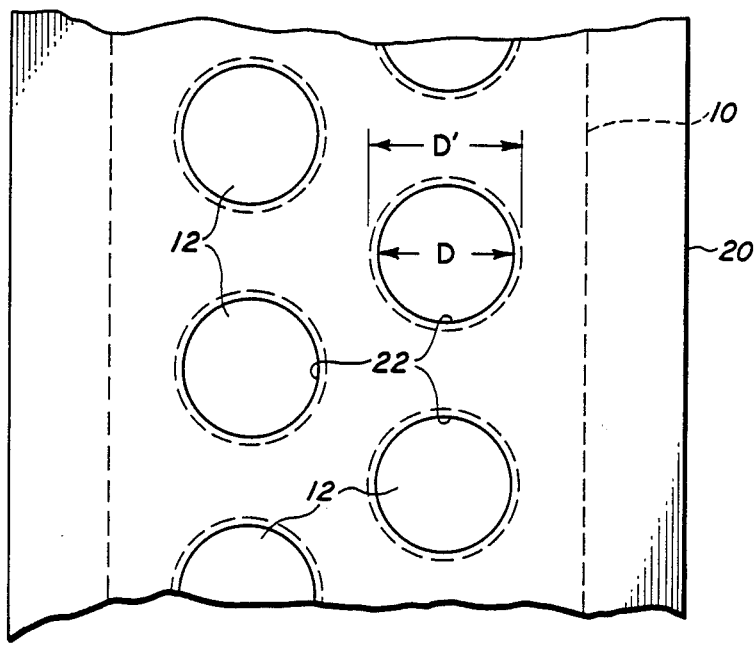
FIG. 8 is a top view of a lens array including an overlying mask at one of the end surfaces.

An additional component of stray light may be caused by light scattering from the rough edges of the fiber end faces. The rough edges are formed during the final grinding and polishing of the rod end faces. This stray light component may be eliminated as shown in FIG. 8, by placing aperture mask 20 over the end faces of the array. The mask has a plurality of apertures 22 overlaying the fibers 12. Each aperture 22 would have a diameter D slightly smaller than the fiber diameter D' so that the rough outer edges are masked.

Although the invention has been described with respect to the above-identified embodiments, other embodiments are possible consistent with the spirit of the invention. For example, although lens arrays having two rows of fibers in a bundled configuration have been shown, it is also possible to practice the invention in a lens array comprising a single row of fibers. As another example, the mask covering the rough outer edge is useful for prior art embodiments as well as the embodiments described in connection with the present invention.

What is claimed is:

1. A gradient index lens array comprising, in combination:
    at least one row of gradient index optical fibers, the fibers having smooth surfaces;
    a low transmittance, low viscosity coating formed in optical contact with said fiber surfaces, having an index approximately equal to that of the fiber surface; and
    a low reflection material forming a binding between the coated fibers, said material filling the interstitial area between said coated fibers and the outer side of the lens array.

2. A lens array according to claim 1 wherein said coating is lacquer.

3. A lens array according to claim 2 wherein said lacquer layer has a thickness of approximately 15 microns.

4. A gradient index lens array comprising, in combination:
    a plurality of gradient index optical fibers arranged in a linear row, each fiber having a diameter D';
    a light absorbing material formed around each of said fibers; and
    an opaque mask positioned above at least one face of said array, the mask having a plurality of circular apertures aligned with the fiber end faces, the mask apertures having a diameter D slightly smaller than the fiber diameter D'.

5. A method for reducing light flare in a gradient index lens array comprising the steps of:
    (a) forming the gradient index optical fibers comprising the array with a smooth outer surface,
    (b) coating the fiber surfaces with a low transmittance, low viscosity material having the same index as the fiber surface, and
    (c) filling the interstitial areas of the lens array with a light absorbing material.

* * * * *